(12) United States Patent
Williams

(10) Patent No.: US 6,813,994 B2
(45) Date of Patent: Nov. 9, 2004

(54) MULTI-COMPARTMENTED GRIDDLE IRON

(76) Inventor: Brian Williams, 57 Putnam Ave., Brooklyn, NY (US) 11238

( * ) Notice: Subject to any disclaimer, the term of this patent is extended or adjusted under 35 U.S.C. 154(b) by 144 days.

(21) Appl. No.: 10/261,638

(22) Filed: Sep. 30, 2002

(65) Prior Publication Data

US 2004/0060457 A1 Apr. 1, 2004

(51) Int. Cl.⁷ .............................................. A47J 43/18
(52) U.S. Cl. .............................. 99/426; 99/428; 99/448; 99/343
(58) Field of Search ............................ 99/426, 428, 448, 99/343, 342, 432, 442, DIG. 15; 249/DIG. 1, 53 R, 53 M

(56) References Cited

U.S. PATENT DOCUMENTS

| 1,281,943 | A | * | 10/1918 | Gonsalves ................... 249/131 |
| 1,745,592 | A | | 2/1930 | Robertson |
| 1,987,594 | A | * | 1/1935 | Chiles et al. .................. 99/426 |
| D109,658 | S | | 3/1938 | Hamilton |
| 2,497,280 | A | | 2/1950 | Stier |
| 3,227,066 | A | | 1/1966 | Cady |
| D207,406 | S | | 4/1967 | Van Meter |
| 3,780,978 | A | | 12/1973 | Proul |
| 3,994,211 | A | | 11/1976 | Stanek |
| 4,345,516 | A | * | 8/1982 | Sinclair ....................... 99/426 |
| D270,225 | S | | 8/1983 | Chiulli |
| D292,165 | S | | 10/1987 | Oh |
| 5,131,320 | A | | 7/1992 | Jensen et al. |
| D383,354 | S | | 9/1997 | Nassar |
| 6,065,393 | A | * | 5/2000 | Lombard et al. ............. 99/427 |
| 6,092,459 | A | | 7/2000 | Zhang |

* cited by examiner

Primary Examiner—Reginald L. Alexander
(74) Attorney, Agent, or Firm—Davidson, Davidson & Kappel, LLC

(57) ABSTRACT

A compartmented cooking device for simultaneously cooking a plurality of articles on a flat heated surface has an outer wall around the perimeter of an area and at least one internal wall within the area for defining a plurality of compartments for receiving a material to be cooked and for maintaining the material separately on the heated surface. The compartments can be all of substantially equal area and shape, such as square, rectangular, triangular, rhomboid, trapezoid, circular, oval or any other shape, and are all open from both an upward direction and a downward direction. The walls of each compartment should have at least one marking thereon for delineating a desired level for insertion of material to be cooked. The device also has a handle for allowing it to be lifted off the griddle without a user having to touch the walls of the device.

13 Claims, 2 Drawing Sheets

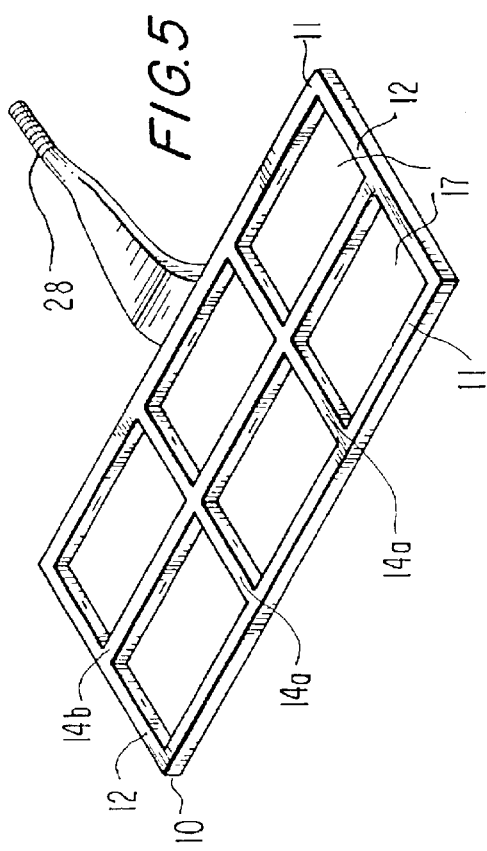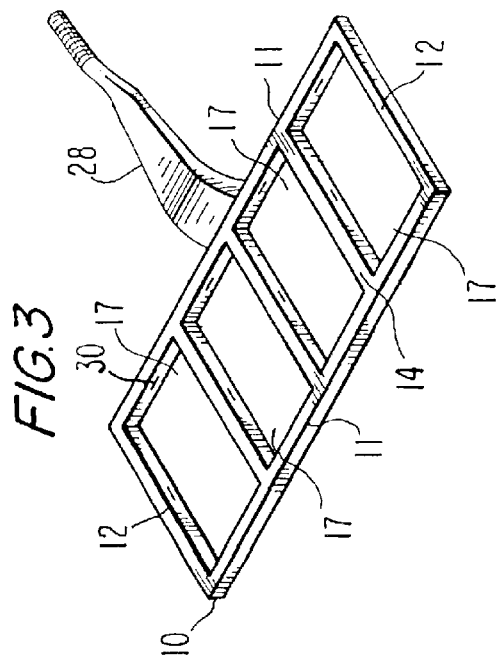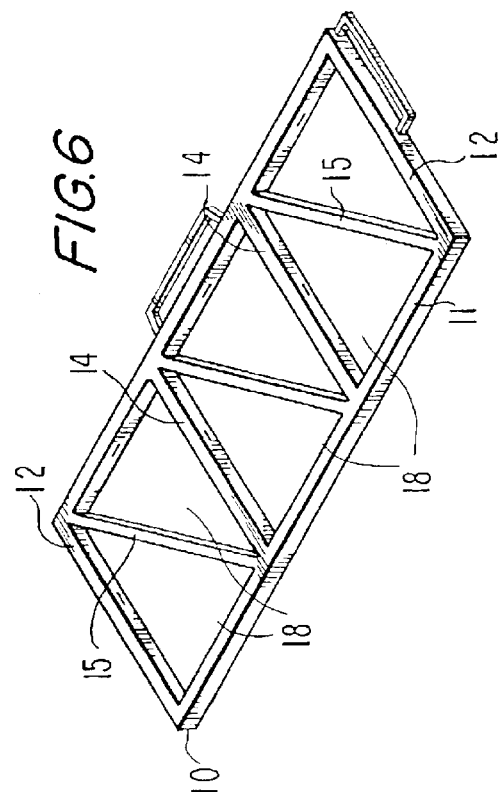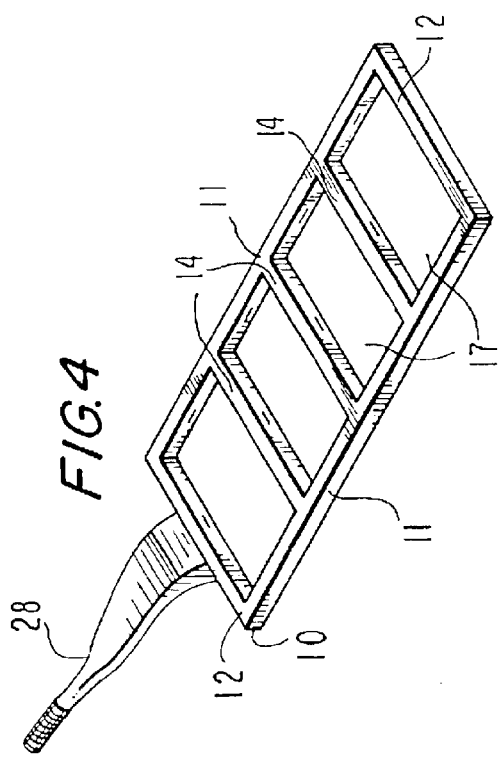

MULTI-COMPARTMENTED GRIDDLE IRON

BACKGROUND OF THE INVENTION

The present invention relates to a cooking utensil for frying foodstuffs on a griddle. More particularly, this invention relates to a multi-compartmented utensil for use with a griddle.

Griddles are known and utilized for frying various foodstuffs including pancakes, eggs, crepes or fried sandwiches. The cooking surface or griddle is usually a flat planar surface, which either can be positioned over a source of heat or is integrally built into an appliance for direct heating by a source of heat. The heat is conducted through the griddle wall thickness to elevate the temperature of the upper surface, and a lubricant cooking fluid, grease or release-agent is applied to this surface prior to frying the foodstuff. The release agent prevents sticking of the fried food to the griddle and inhibits burning of the food surface at the griddle surface.

The conventional technique of cooking pancakes includes the steps of (1) pouring a batter onto a flat and normally pre-heated griddle surface, whereby a substantially rounded and flat pad is formed, (2) leaving the batter pad to cook on its downward or first side, (3) flipping the partially-cooked batter pad over, and (4) leaving the batter pad to cook on its opposite or second side. This conventional process normally produces a pancake that has a browned skin or casing on each side.

The dimensions of a pancake cooked by the conventional technique are at least partially controlled by the flow characteristics of the batter and the amount of batter poured. For a given amount of batter poured, a thinner batter will spread out more than a thicker batter, forming a wider and thinner pancake. The spreading of the batter is generally outward from the pouring point, except of course in any direction in which spreading is impeded, such as by a physical barrier. Any partial cooking or heating of the batter during its spreading will modify its flow characteristics and will generally slow or diminish spreading.

Conventional pancake cooking techniques using conventional apparatuses will generally not produce multiple pancakes of uniform size, shape and thickness unless there is a stringent uniformity imposed upon all dimension-determining factors, including without limitation the batter's flow characteristics, the amount of batter poured, the temperature of the griddle surface and the modification of the batter's flow characteristics by partial cooking or heating during its spreading. Such stringent uniformity would be particularly difficult to achieve, or even approach, when using conventional techniques and conventional apparatus during high-volume manual cooking operations, when many such cooked items are needed within a short time.

Previous attempts to provide a device that would allow production within a short period of time of multiple cooked items, such as pancakes, of uniform size and shape have fallen short. For example, U.S. Pat. No. 1,281,943 to Gonsalves, U.S. Pat. No. 1,745,592 to White, U.S. Pat. No. D-109,658 to Hamilton, U.S. Pat. No. D-270,225 to Chiulli and U.S. Pat. No. D-383,354 to Nassar all provide multi-compartmented frying pans having closed sides for use in simultaneously frying or cooking multiple items of identical shape. Whereas these devices all enable the several items that fit within the pan to be cooked simultaneously within a short period of time, flipping of the items within the frying pan and removal of the items from the frying pan are much more difficult tasks because the cooking is not performed directly on a flat griddle but rather within the shaped frying pan whose sides may interfere with removal of the cooked or partially-cooked item. Thus, repeated cooking using the same device is much slower, because time gained by cooking several items at one time within the device is outweighed by the extra time and inconvenience involved in attempting to remove items from the frying pan. Accordingly, while such devices may be used to cook several items simultaneously, using the device repeatedly to achieve high volume cooking of uniform items cannot be achieved with these devices.

U.S. Pat. No. 3,780,978 to Proul describes an individual cooking form for use with a frying pan or grill. The cooking form has a shaped outer wall with an open middle region but no bottom, whereby eggs or batter that is poured directly onto the griddle is confined to the area within the form so that food may be given an interesting and appealing appearance while also permitting control over the product shape and thickness. The cooking form also has an enlargement of the wall at one point around its periphery and a recess within that enlargement to allow a cooking implement to serve as handle for lifting the form. This device, however, does not allow the user to cook multiple such items at one time without separate cooking forms being used, because only one such item may be cooked in a form at one time. In addition, the lack of a separate gripping handle makes such a device clumsy and difficult to use.

Similarly, U.S. Pat. No. 2,497,280 to Stier describes an individual cooking form for shaping or molding eggs on a frying pan or griddle into the shape and appearance of a flower, such as a daisy. A pivotable handle is provided in order to allow the mold to be readily placed on or lifted from a frying pan surface. This device also does not allow the user to cook multiple such items at one time without separate cooking forms being used, because only one such item may be cooked in a form at one time. Although the reference states that a plurality of such molds may be coupled together or that a mold having a plurality of apertures for receiving a number of eggs simultaneously may be readily employed, no description of how such a device may be employed or constructed is provided, and this would be particularly important for a device with a non-standard shape, as disclosed, several of which could not be easily combined. This device thus does not allow for truly high volume cooking of uniform items.

SUMMARY OF THE INVENTION

It is an object of the present invention to provide a device for cooking multiple articles of identical size, shape and thickness.

It is another object of the present invention to provide a device for cooking articles at a high volume within a short period of time.

It is still another object of the present invention to provide a device for cooking multiple articles of identical size, shape and thickness at a high volume within a short period of time.

It is yet another object of the present invention to provide a device for cooking multiple articles of a variety of sizes, shapes and thicknesses at a high volume within a short time period.

In accordance with the above objects and others that will be obvious to those skilled in the art, the present invention is directed to a compartmented cooking device for simultaneously cooking a plurality of articles on a flat heated surface. The device has an outer wall that extends continuously around the perimeter of an area and at least one internal wall within the area and integrally formed with the outer wall. The internal walls define within the area a plurality of compartments for receiving a material to be cooked and for maintaining the material separately on the heated surface. In one preferred embodiment, the compartments are all of substantially equal area and shape, such as square, rectangular, triangular, rhomboid, trapezoid, circular, oval or any other shape, and are all open from both an upward direction and a downward direction. In another embodiment, the compartments are not necessarily all of substantially equal area and shape, and compartments of a variety of areas, shapes and dimensions may be included within the same device.

The bottom surfaces of the external and internal walls should be substantially flat, such that the device may rest substantially flat on the flat griddle. The walls of each compartment should have at least one marking thereon for delineating a desired level for insertion of material to be cooked, and the respective markings on each compartment should delineate the same levels. The device also has a handle for allowing it to be lifted off the griddle without a user having to touch the walls of the device.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIG. 3 shows a perspective view of a third embodiment of the invention;

FIG. 4 shows a perspective view of a fourth embodiment of the invention;

FIG. 5 shows a perspective view of a fifth embodiment of the invention; and

FIG. 6 shows a perspective view of a sixth embodiment of the invention.

DETAILED DESCRIPTION OF THE INVENTION

Figure 1:
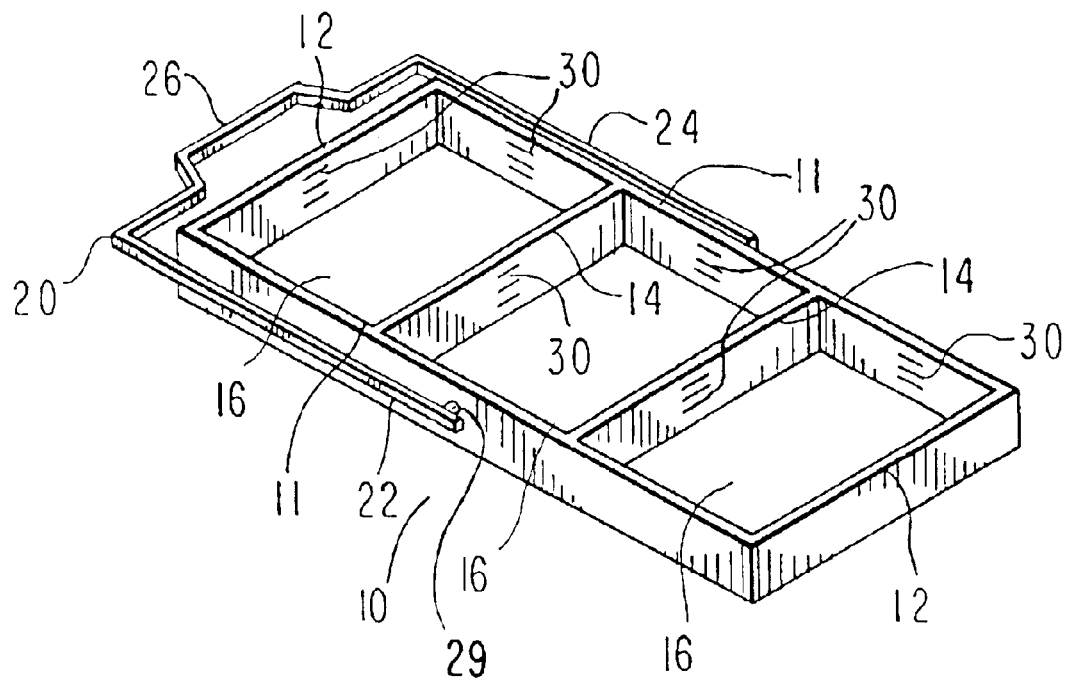
FIG. 1 shows a perspective view of a first embodiment of the invention.

Referring now to the drawings, in particular to FIG. 1, a first embodiment of a multi-compartmented griddle iron according to the present invention is shown. The griddle iron, or form, 1 comprises an upstanding peripheral wall 10 formed of two parallel external side walls 11 and two parallel external end walls 12, and a upstanding internal walls 14 that extend within peripheral wall 10, either parallel to or perpendicular to external side walls 11 and parallel external end walls 12. In the embodiment shown in FIG. 1, internal walls 14 are parallel to external end walls 12 and are perpendicular to external side walls 11.

In one embodiment, walls 11, 12 and 14 of griddle iron 1 are preferably formed from strips of stainless steel that are spot welded together to fabricate the apparatus. In another embodiment, griddle iron 1 may be made of any material acceptable for cooking purposes such as iron, steel, aluminum, copper, ceramic, glass, plastic or other any other suitable material that is able to withstand the heat of cooking on a griddle. Griddle iron 1 may also be coated with a material to which food will not adhere, such as polytetrafluoroethylene or TEFLON®, or have a surface other than the base material that has been applied to the base material in order to provide a surface with greater durability, color enhancement characteristics and, especially, non-stick properties It is preferable that all parts of griddle iron 1, e.g., side walls 11, end walls 12 and internal walls 14, be formed together as one unitary structure. In one embodiment, side walls 11, end walls 12 and internal walls 14 can be made together as one molded piece. In another embodiment, side walls 11, end walls 12 and internal walls 14 can all be made as separate pieces that are then bonded or welded together to form griddle iron 1. Such bonding, however, should be of the permanent type, since griddle iron 1 is to be used on a griddle with intense heat that may tend to separate parts that are not otherwise permanently joined. Similarly, it is undesirable for parts that are not joined permanently to become loose, especially when used over intense heat.

As shown in FIG. 1, internal walls 14, together with external walls 11 and 12, define internal compartments 16. In the preferred embodiment shown in FIG. 1, griddle iron 1 has two internal walls 14 that are straight, i.e., not curved or shaped in any way, such that three compartments 16 are formed among, and bounded by, internal walls 14, external end walls 12 and external side walls 11. The lengths of parallel external walls 11 and 12 and the lengths of internal walls 14 are preferably selected so that compartments 16 all have approximately equal dimensions and shape. In this way, batter or other cooking material poured into compartments 16 will yield items that are all similar or nearly identical in size, shape, and dimension after cooking is complete. In one preferred embodiment, the insides of compartments 16 are square with, for example, internal dimensions of 5"×5".

The heights of external walls 11 and 12 and of internal walls 14 will depend on the intended application of the apparatus, but a height of approximately 1 cm is suitable for cooking eggs and 1–3 cm is suitable for cooking pancake batter. Similarly, the thicknesses of external walls 11 and 12 and of internal walls 14 are set so as to provide sufficient support for the frame of form 1. Typically, a thickness of approximately 1 cm or ¼"0 is suitable for walls 11, 12 and 14. It is preferable that compartments are preferably all open from both an upward direction and a downward direction.

In order to ensure that all items cooked with in the griddle iron are of similar thickness, the user must place a similarly measured amount of batter, egg or other cooking fluid into each compartment 16. In one preferred embodiment, as shown in FIG. 1, internal walls 14 and/or the inside faces of side walls 11 and end walls 12 are provided with markings 30 printed, etched or otherwise made thereon to delineate specific heights from the griddle surface to the top of walls 14, according to the desired thickness of the cooked material. The user would pour the liquid to be cooked into a respective compartment 16 until the level of the liquid poured into that compartment has reached the desired marking 30 on wall 11, 12 or 14. In order to ensure that the same amount of liquid is poured into each compartment 16 and thus the items cooked within compartments 16 all have approximately the same thickness, the same level markings 30 should be referenced in each compartment within one griddle iron.

The lower side of griddle iron 1, i.e., the undersides of upstanding side walls 11, end walls 12 and internal walls 14, is flat so that, when griddle iron 1 is placed on a flat griddle for cooking, the lower side of griddle iron 1 sits substantially flush against the top of the griddle, and there is no appreciable space between the lower side of griddle iron 1 and the top surface of the griddle. Thus, virtually no batter or eggs or any other fluid that is poured into compartments 16 is permitted to run beneath external walls 11 and 12 and internal walls 14 and to flow outside of griddle iron 1 or from one compartment 16 to another. In order to aid in preventing batter or eggs or other fluid from flowing beneath the lower side of griddle iron 1, the griddle iron must be made sufficiently heavy to prevent cooked fluid that is poured into compartments 16 and from seeping beneath walls 11, 12 or 14 from lifting griddle iron 1 off the surface of the griddle.

Griddle iron 1 is also provided with a handle 20 for lifting and moving the griddle iron 1 to different locations on the griddle. In one embodiment, as shown in FIGS. 1 and 2, handle 20 has two ends 22 and 24 that are mounted, for balance on opposite sides of the peripheral wall 10, i.e., 180 degrees apart.

FIG. 1 shows respective handle ends 22 and 24 being mounted on the outsides of opposing side walls 11. In one embodiment, handle ends 22, 24 are immovably set to the sides of peripheral wall 10. In a more preferred embodiment, such mounting can be accomplished by means of rivets, screws or some other appropriate mechanism 29 so as to allow handle ends 22 and 24 to rotate with respect to side walls 11 such that handle 20 may be pivoted relative to peripheral wall 10 between a collapsed or resting position, as shown in FIG. 1, in which it is parallel to the griddle and in which handle grip portion 26 lies adjacent end wall 12, and a use position in which handle 20 stands perpendicular to, or at least apart from, the griddle, such that a user may hold grip portion 26 of handle 20 to lift and move griddle iron 1 to a different location. Except for grip portion 26, the shape of handle 20 could be substantially the same as the shape of peripheral wall 10 from the location of one pivot 29 to the location of the other pivot 29. Grip portion 26 of handle 20 could then extend outward beyond the shape of wall 12 to form a handle portion for a user to hold.

Figure 2:
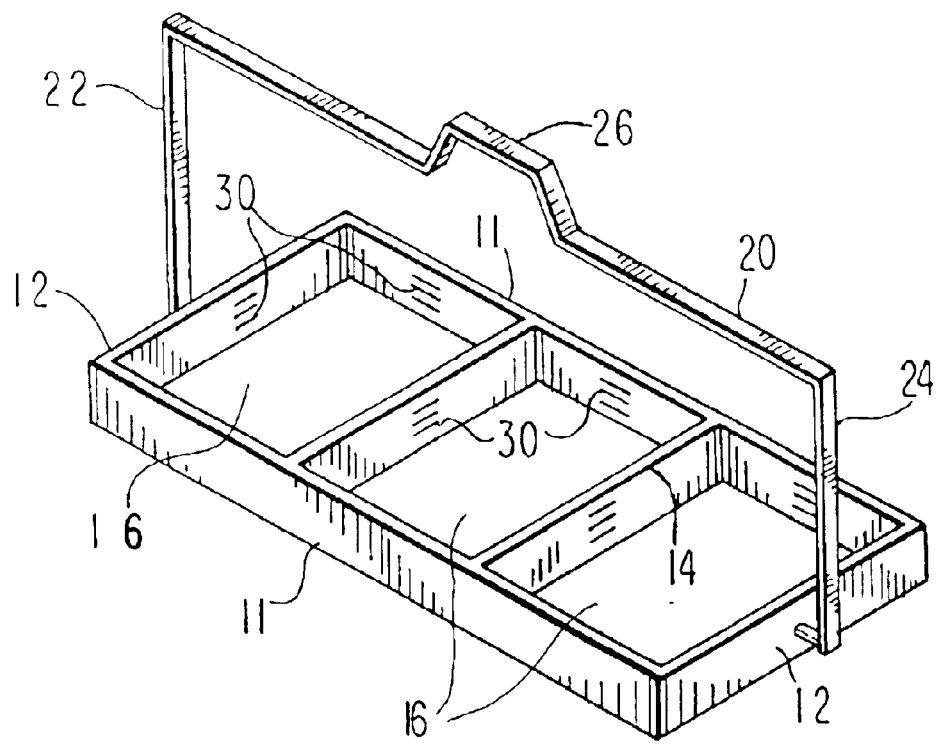
FIG. 2 shows a perspective view of a second embodiment of the invention.

FIG. 2 shows griddle iron 1 with handle 20 having respective handle ends 22 and 24 that are mounted 180 degrees apart on the outsides of opposing end walls 12. This mounting is done as with the embodiment shown in FIG. 1, such that handle ends 22 and 24 rotate with respect to end walls 12 and handle 20 may be pivoted relative to peripheral wall 10. Grip portion 26 of handle 20 extends outward beyond the shape of wall 11 to form a handle portion for a user to hold. Handle 20 may be pivoted between a collapsed position in which handle 20 is parallel to the griddle and in which handle grip portion 26 lies adjacent side wall 11, as shown in FIG. 2, and a use position in which handle 20 stands perpendicular to the griddle, such that a user may hold grip portion 26 of handle 20 to lift and move griddle iron 1 to a different location.

Alternatively, as shown in FIGS. 3–5, griddle iron 1 could be provided with a handle 28 that is essentially a frying pan type handle in that it projects from a peripheral wall 10 at one side or at one end of griddle iron 1. As shown in FIG. 3, handle 28 has two ends, one end that is immovably attached, by bonding, welding, molding or some other acceptable means, to griddle iron 1 at a side or end, and a free end that projects outwardly from one side or one end of griddle iron 1. As shown in FIG. 3, handle 28 is bonded to or molded to griddle iron 1 at one side and is cantilevered upward and outward from side wall 11 of griddle iron 1. As shown in FIG. 4, handle 28 is bonded to or molded to griddle iron 1 at an end and is cantilevered upward and outward from end wall 12 of griddle iron 1. In this embodiment of the handle, handle 28 is not pivotally attached, as in the embodiment of FIGS. 1 and 2, but rather is permanently set in a position relative to griddle iron 1 such that the griddle iron may be lifted steadily as a single unitary structure, without rocking or pivoting of griddle iron 1.

In operation, griddle iron 1 rests on its flat bottom flush against the top surface of a flat cooking griddle or other flat heated surface. The batter or egg or other fluid to be cooked is poured into compartments 16 in measured amounts. Markings 30 could be used as references for the desired cooking fluid to be inserted into each compartment 16. The surrounding walls of each compartment 16 serve to confine the batter, egg or other cooking fluid that has been poured into that compartment 16 and serves to form this fluid into the shape of that particular compartment 16. Once the batter, egg or other cooking fluid in each compartment 16 has at least partially cooked on its downward side, griddle iron 1 can be lifted off the griddle.

At this point, because the batter, egg or other cooking fluid in each compartment 16 has at least partially cooked, the batter, egg or other cooking fluid will not run along the griddle if griddle iron 1 and the constraints of compartments 16 are removed. Griddle iron 1 can then be moved to another location on the griddle and the procedure can be repeated. Once the batter, egg or other cooking fluid has fully cooked on its downward side, forming a partially-cooked batter pad, the pad can be flipped over so that the upward side may be cooked as well. At the same time, griddle iron is allowing a new group of batter, egg or other cooking fluid forms to cook within compartments 16. Thus, the user may continuously form new pancakes within griddle iron 1 as the previous group that have already been formed within compartments 16 have at least partially cooked.

In alternative preferred embodiments, griddle iron 1 may be configured such that internal walls 14 and external walls 11 and 12 define compartments for cooking a plurality of articles of different number, shapes or sizes than is shown in FIG. 1. In any case, as discussed below, it is preferable that the lengths of the walls be selected so that all the compartments within one griddle iron all have approximately equal sizes, shapes and dimensions so that uniformity of the cooked articles may be achieved.

For example, in a preferred embodiment, the lengths and dimensions of parallel external walls 11 and 12 and the lengths of internal walls 14 may be selected so that there are more or fewer compartments than the three shown in FIG. 1. In one such embodiment, external side walls 11, external end walls 12 and/or internal walls 14 may be longer, and internal walls 14 may be more numerous, so that more than three compartments 16 are formed within peripheral wall 10. For example, as shown in FIGS. 3 and 4, another embodiment of the griddle iron 1 comprises, in addition to upstanding peripheral wall 10 having external side walls 11 and external end walls 12, three upstanding internal walls 14 that extend between and parallel to end walls 12 and that are perpendicular to side walls 11 to form among them four compartments 17. The lengths of internal walls 14 are selected such that, in this embodiment, four compartments 17 of equal areas and shape are formed.

Such compartments may be arranged in one column, as shown in FIGS. 1–4, or in more than one column, as shown in FIG. 5. In the case where the compartments are arranged in more than one column, there may be internal walls extending in more than one direction, such as lateral internal walls 14a and longitudinal internal walls 14b, as shown in FIG. 5.

In another preferred embodiment, the lengths and dimensions of external side walls 11, external end walls 12 and internal walls 14 may be selected so that compartments 16 may be of different shape than the square compartments 16 shown in FIG. 1. For example, in one such preferred embodiment, shown in FIGS. 3, 4 and 5, compartments 17 are formed within peripheral wall 10 with rectangular shape.

In another such preferred embodiment, shown in FIG. 6, compartments 18 are formed within peripheral wall in triangular shape. In this embodiment, as shown in FIG. 6, there are internal walls extending in more than one direction, such as standard lateral internal walls 14 and diagonal internal walls 15. Similarly, in other preferred embodiments, the compartments may have other shapes, such as, rhomboidal, trapezoidal, circular, oval, etc. With respect to various shapes within the griddle iron, it is preferable that the shapes be geometric so that they may more easily fit within a griddle iron with a minimum of wasted space.

In an alternative embodiment, if a diversity of sizes, shapes and dimensions, i.e., non-uniformity, of the cooked articles is desired, then the compartments 16 within one griddle iron 1 may not necessarily all have equal sizes, shapes and dimensions. In such an embodiment, compartments 16 of a variety of sizes, shapes and dimensions may be included within one griddle iron. In this embodiment, the lengths of internal walls 14 are selected such that a specified number of compartments of the desired variety of sizes, shapes and dimensions is formed.

Thus, a multi-compartmented griddle iron has been provided. One skilled in the art will appreciate that the present invention can be practiced by other than the described embodiments, which are presented for purposes of illustration and not limitation.

I claim:

1. A compartmented cooking implement for simultaneously cooking a plurality of articles on a flat heated surface, comprising:

a first wall extending continuously around the perimeter of an area;

at least one second wall within said area and integrally formed with said first wall, said at least one second wall defining within said area a plurality of compartments for receiving a material to be cooked and for maintaining the material separately on the heated surface, said compartments all being open from both an upward direction and a downward direction;

each compartment having at least one marking provided on at least one of said first wall and said at least one second wall, delineating a desired level for insertion of material to be cooked;

said first wall and said at least one second wall each having a top surface and having a bottom surface that is substantially flat, such that said implement may rest substantially flat on the flat heated surface; and a handle for allowing said implement to be lifted off said heated surface without a user having to touch said first and second walls.

2. The compartmented cooking implement according to claim 1 wherein said at least one second wall defines within said area a plurality of compartments that are of substantially equal area and shape.

3. The compartmented cooking implement according to claim 2 wherein said plurality of compartments are all substantially square shaped.

4. The compartmented cooking implement according to claim 2 wherein said plurality of compartments are all substantially rectangular shaped.

5. The compartmented cooking implement according to claim 2 wherein said plurality of compartments are all substantially triangular shaped.

6. The compartmented cooking implement according to claim 2 wherein said plurality of compartments are all substantially rhombus shaped.

7. The compartmented cooking implement according to claim 2 wherein said plurality of compartments are all substantially trapezoid shaped.

8. The compartmented cooking implement according to claim 2 wherein said plurality of compartments are all substantially circular shaped or oval shaped.

9. The compartmented cooking implement according to claim 1 wherein said at least one second wall defines within said area a plurality of compartments that are of a variety of areas and shapes.

10. The compartmented cooking implement according to claim 1 wherein said first wall and said at least one second wall are at least partially coated with a non-stick and heat withstanding material.

11. The compartmented cooking implement according to claim 1 wherein the respective markings in each compartment delineates the same desired levels for insertion of material to be cooked as the respective marking in the other compartments.

12. The compartmented cooking implement according to claim 1 wherein said handle has two ends that are pivotally mounted to opposite sides or ends of said first wall, such that said handle is pivotable from a first position in which it is parallel to said heated surface and a second position in which it is perpendicular to said heated surface.

13. The compartmented cooking implement according to claim 1 wherein said handle has two ends, a free end and a second end that is immovably attached to said first wall, projecting outwardly from one side or one end of said first wall.

* * * * *